United States Patent
Fujii et al.

(10) Patent No.: US 12,005,570 B2
(45) Date of Patent: Jun. 11, 2024

(54) IMAGE DISPLAY DEVICE AND IMAGE DISPLAY METHOD

(71) Applicant: JVCKENWOOD Corporation, Yokohama (JP)

(72) Inventors: Shunichi Fujii, Yokohama (JP); Yuichi Arahata, Yokohama (JP); Takayuki Arase, Yokohama (JP); Satoshi Yoshimura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 141 days.

(21) Appl. No.: 17/950,800

(22) Filed: Sep. 22, 2022

(65) Prior Publication Data
US 2023/0191622 A1      Jun. 22, 2023

(30) Foreign Application Priority Data

Dec. 22, 2021   (JP) ................................. 2021-207781

(51) Int. Cl.
| | |
|---|---|
| *B25J 13/08* | (2006.01) |
| *B25J 19/02* | (2006.01) |
| *H04N 13/161* | (2018.01) |
| *H04N 13/194* | (2018.01) |
| *H04N 13/239* | (2018.01) |
| *H04N 13/332* | (2018.01) |

(52) U.S. Cl.
CPC ........... *B25J 13/088* (2013.01); *B25J 19/023* (2013.01); *H04N 13/161* (2018.05); *H04N 13/194* (2018.05); *H04N 13/239* (2018.05); *H04N 13/332* (2018.05)

(58) Field of Classification Search
None
See application file for complete search history.

(56) References Cited

U.S. PATENT DOCUMENTS 10,334,169 B2 *   6/2019   Kobayashi ......... H04N 23/6812

FOREIGN PATENT DOCUMENTS

JP          6801136 B1     11/2020

* cited by examiner

Primary Examiner — Christopher Braniff
(74) Attorney, Agent, or Firm — Nath, Goldberg & Meyer; Jerald L. Meyer (57) ABSTRACT

A synchronization controller performs control so that operator motion data is transmitted to a robot when a synchronization switch is set to ON which allows synchronization of a rotational motion of an operator with a rotational motion of the robot. An image correction unit, when there is a difference between a first rotation angle of the operator and a second rotation angle of the robot, corrects a cutout range of an image so as to be equal to a range corresponding to the first rotation angle. The synchronization controller performs control so that the operator motion data is not transmitted to the robot when the synchronization switch is set to OFF which does not allow synchronization of a rotational motion of the operator with a rotational motion. The image correction unit corrects the cutout range so as to be equal to a range corresponding to the first rotation angle.

5 Claims, 6 Drawing Sheets

IMAGE DISPLAY DEVICE AND IMAGE DISPLAY METHOD

CROSS REFERENCE TO RELATED APPLICATION

This application is based upon and claims the benefit of priority under 35 U.S.C. § 119 from Japanese Patent Application No. 2021-207781 filed on Dec. 22, 2021, the entire contents of which are incorporated herein by reference.

BACKGROUND

The present disclosure relates to an image display device and an image display method.

As disclosed in Japanese Patent No. 6801136, a remote control system in which a user, wearing an image display device such as a head-mounted display, controls a robot (remotely controlled device) existing in a remote place has been put into practical use. The technique used in this type of remote control system to control a remote robot in real time is called telexistence.

SUMMARY

When an operator wearing the image display device rotates his/her head by, for example, 30 degrees, the robot also rotates a movable unit by 30 degrees in response to the rotation of the head. However, in practice, depending on the accuracy of a driver such as a motor for driving the movable unit, the movable unit cannot be rotated by 30 degrees accurately, and thus the rotation angle may deviate. As a result, this deviation between a viewing angle recognized by the operator corresponding to the angle of rotation and a viewing angle at which a camera mounted on the robot actually captures the surroundings of the robot may cause telexistence motion sickness.

A first aspect of one or more embodiments provides an image display device including: an operator motion data acquisition unit configured to acquire operator motion data indicating a first rotation angle produced when an operator who operates a robot performs a rotational motion; a robot motion data acquisition unit configured to acquire robot motion data which indicates a second rotation angle produced when the robot performs a rotational motion in accordance with the operator motion data and is transmitted from the robot; an image data acquisition unit configured to acquire image data which is generated by being captured by a 360-degree camera provided in the robot and is transmitted from the robot; an image correction unit configured to supply, to a display panel, image data in a cutout range obtained by cutting out a range of an image to be displayed on the display panel to be viewed by the operator, from the image data acquired by the image data acquisition unit, and to correct the cutout range; a synchronization switch configured to set whether or not to synchronize a rotational motion of the operator with a rotational motion of the robot; and a synchronization controller configured to perform control so that the operator motion data is transmitted to the robot when the synchronization switch is set to ON which allows synchronization of a rotational motion of the operator with a rotational motion of the robot, and to control the image correction unit to correct the cutout range so as to be equal to a range corresponding to the first rotation angle when there is a difference between the first rotation angle and the second rotation angle, and configured to perform control so that the operator motion data is not transmitted to the robot when the synchronization switch is set to OFF which does not allow synchronization of a rotational motion of the operator with a rotational motion of the robot, and to control the image correction unit to correct the cutout range so as to be equal to a range corresponding to the first rotation angle.

A second aspect of one or more embodiments an image display method including: acquiring operator motion data indicating a first rotation angle produced when an operator who operates a robot performs a rotational motion; acquiring robot motion data which indicates a second rotation angle produced when the robot performs a rotational motion in accordance with the operator motion data and is transmitted from the robot; acquiring image data which is generated by being captured by a 360-degree camera provided in the robot and is transmitted from the robot; supplying, to a display panel, image data in a cutout range obtained by cutting out a range of an image to be displayed on a display panel to be viewed by the operator, from the acquired image data; performing control so that the operator motion data is transmitted to the robot when a setting is implemented so that a rotational motion of the operator is synchronized with a rotational motion of the robot, and correcting the cutout range so as to be equal to a range corresponding to the first rotation angle when there is a difference between the first rotation angle and the second rotation angle; and performing control so that the operator motion data is not transmitted to the robot when s setting is set to OFF which does not allow synchronization of a rotational motion of the operator with a rotational motion of the robot, and correcting the cutout range so as to be equal to a range corresponding to the first rotation angle.

DETAILED DESCRIPTION

Hereinafter, an image display device and an image display method according to one or more embodiments will be described with reference to the accompanying drawings. First, a configuration example of a remote control system including an image display device and a remote controlled device will be described with reference to FIG. 1.

Figure 1:
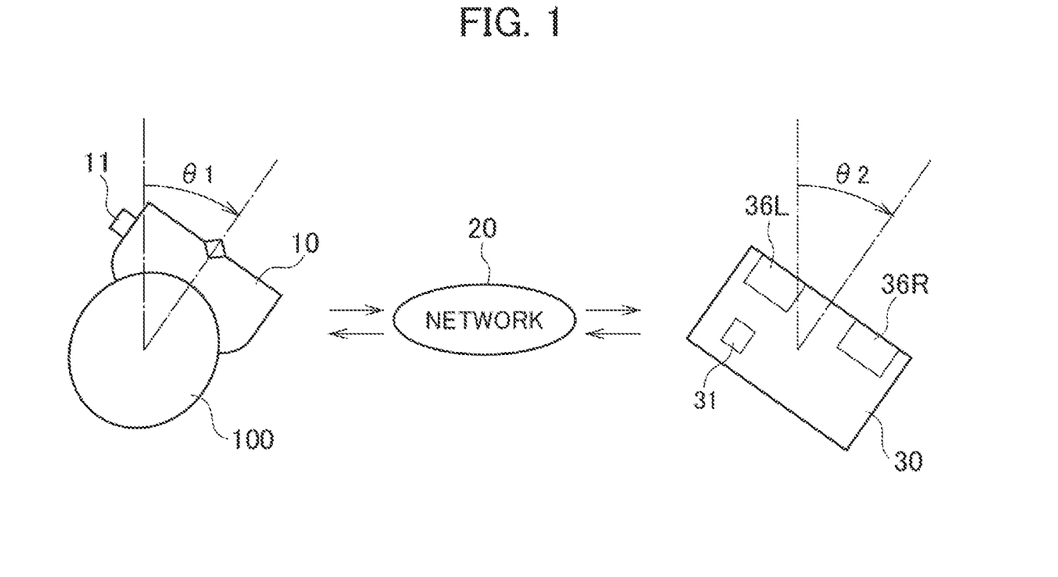
FIG. 1 is a conceptual diagram illustrating a configuration example of a remote control system including an image display device and a remote controlled device connected to each other via a network.

In FIG. 1, an image display device 10 and a robot 30 are connected to each other via a network 20. This network 20 is typically the Internet. The image display device 10 and the robot 30 communicate with each other by means of communication units 11 and 31 provided respectively. The robot 30 is positioned at a remote position away from the place where the image display device 10 is positioned.

The image display device 10 is, as an example, a head-mounted display, and is attached to the head of an operator 100 so as to cover the eyes. The robot 30 is an example of a remote controlled device whose movement is controlled in accordance with the image display device 10 or operator motion data indicating the movement of the operator 100 wearing the image display device 10. The robot 30 includes a right-eye camera 36R and a left-eye camera 36L which are 360-degree cameras mounted with a fisheye lens. The right-eye camera 36R and the left-eye camera 36L generate at least an omnidirectional image in the horizontal direction. In addition, the right-eye camera 36R and the left-eye camera 36L may generate an omnidirectional image (full spherical image) in the horizontal and vertical directions.

Figure 2:
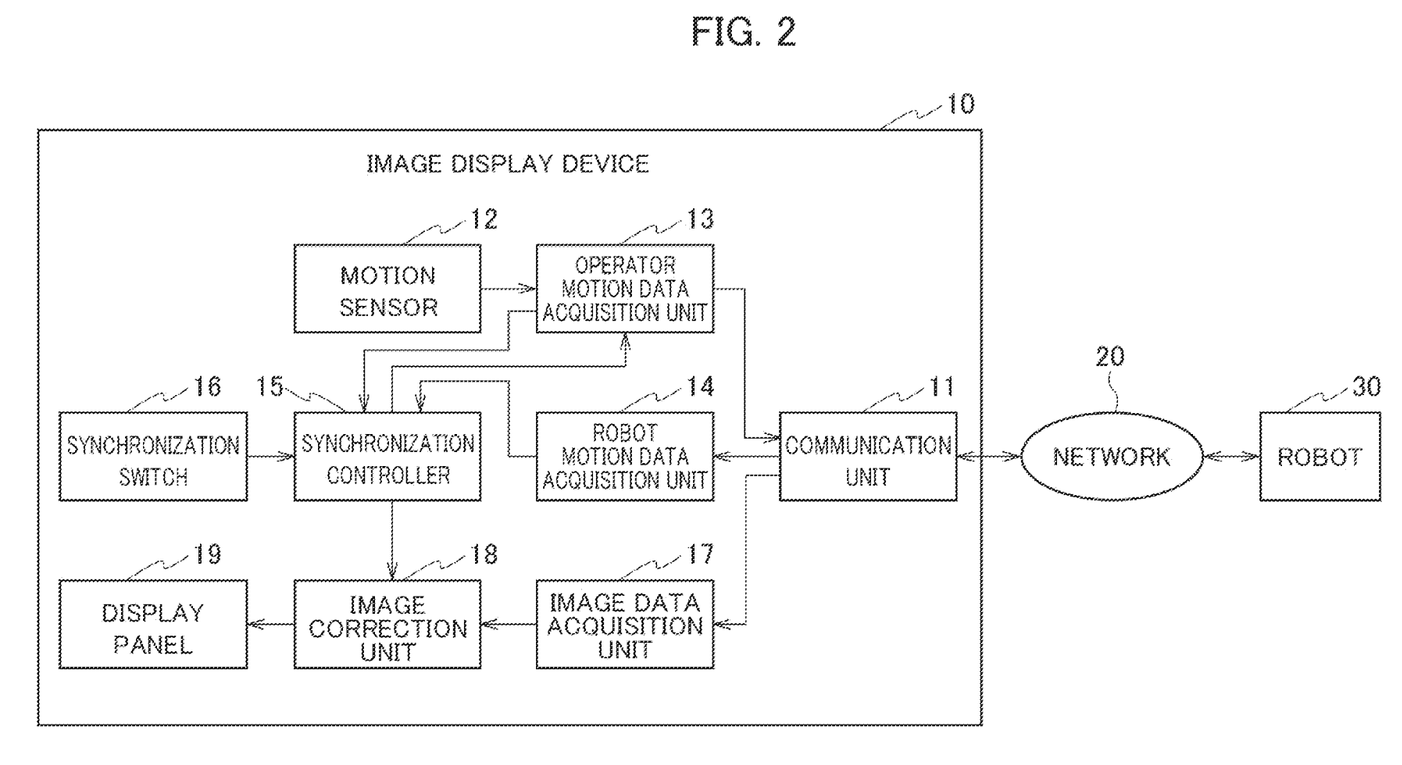
FIG. 2 is a block diagram illustrating an image display device according to one or more embodiments.

FIG. 2 illustrates a specific configuration example of the image display device 10. As illustrated in FIG. 2, the image display device 10 includes, in addition to the communication unit 11, a motion sensor 12, an operator motion data acquisition unit 13, a robot motion data acquisition unit 14, a synchronization controller 15, a synchronization switch 16, an image data acquisition unit 17, an image correction unit 18, and a display panel 19.

The motion sensor 12 includes at least a three-dimensional gyro sensor, and detects an angular velocity when the image display device 10 (that is, the head of the operator 100 in this case) performs a rotational motion. The operator motion data acquisition unit 13 acquires and temporarily stores operator motion data indicating a rotation angle of the image display device 10 based on a detected value for the angular velocity of the motion sensor 12. The communication unit 11 may transmit operator motion data to the robot 30 via the network 20. When the communication unit 11 transmits the operator motion data to the robot 30, a movable unit 34 (see FIG. 3) of the robot 30 performs a rotational motion in accordance with the operator motion data.

The communication unit 11 receives robot motion data illustrating a rotation angle when the movable unit 34 of the robot 30 performs a rotational motion in accordance with the operator motion data. The robot motion data acquisition unit 14 acquires and temporarily stores robot motion data received by the communication unit 11.

The operator 100 selectively sets the synchronization switch 16 to be ON or OFF. When the synchronization switch 16 is set to ON, the synchronization controller 15 controls the operator motion data acquisition unit 13 to supply operator motion data to the communication unit 11 in order to synchronize the motion of the image display device 10 with the motion of the robot 30. When the synchronization switch 16 is set to OFF, the synchronization controller 15 controls the operator motion data acquisition unit 13 so as not to supply operator motion data to the communication unit 11 in order not to synchronize the motion of the image display device 10 with the motion of the robot 30.

The communication unit 11 receives image data that is a 360-degree omnidirectional image generated by being captured by a camera 36 (see FIG. 3) of the robot 30. The image data acquisition unit 17 acquires the image data received by the communication unit 11, and temporarily stores such image data. The camera 36 includes the right-eye camera 36R and the left-eye camera 36L, and the image data includes image data for the right eye and image data for the left eye.

The image correction unit 18 supplies, to the display panel 19, image data in a cutout range obtained by cutting out a range of an image to be displayed on the display panel 19 to be viewed by the operator 100, from the image data acquired by the image data acquisition unit 17. At this time, the image correction unit 18 may correct the cutout range. Since an omnidirectional image has a large distortion, it is preferable that the image correction unit 18 corrects the image in the cutout range so as to reduce the distortion. The synchronization controller 15 corrects the cutout range differently when the synchronization switch 16 is set to ON and when the synchronization switch 16 is set to OFF.

The display panel 19 displays an image based on image data for the right eye in the cutout range, and an image based on image data for the left eye in the cutout range. The display panel 19 may be a liquid crystal panel, an organic EL panel, or an e-paper display.

Figure 3:
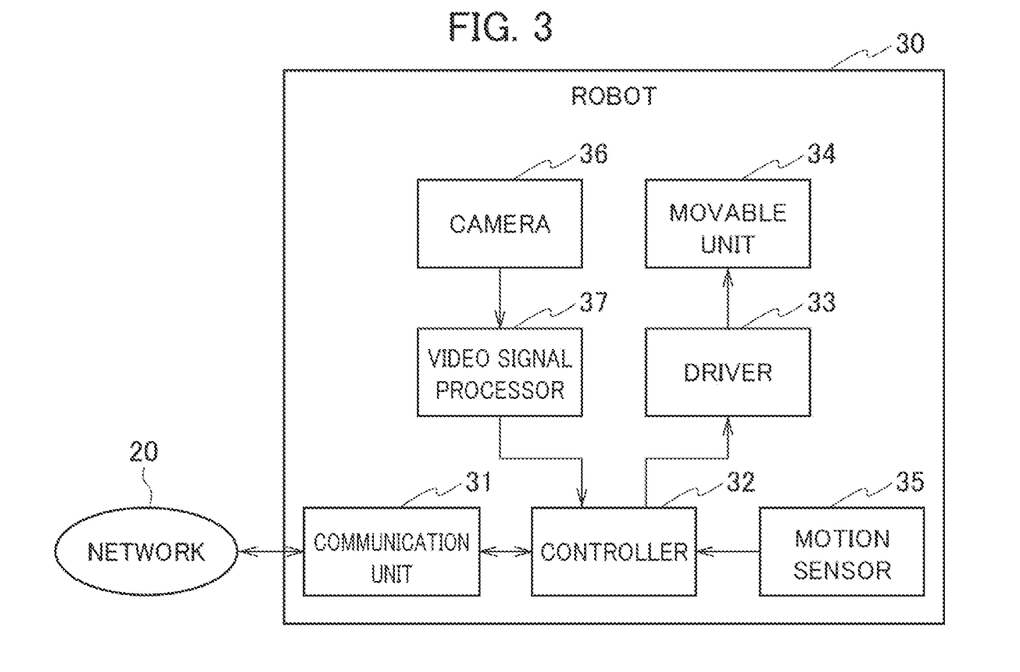
FIG. 3 is a block diagram illustrating a configuration example of a robot as an example of a remote controlled device.

FIG. 3 illustrates a specific configuration example of the robot 30. As illustrated in FIG. 3, in addition to the communication unit 31 and the camera 36, the robot 30 includes a controller 32, a driver 33, a movable unit 34, a motion sensor 35, and a video signal processor 37. The motion sensor 35 and the camera 36 are provided in the movable unit 34, or are provided so as to move integrally with the movable unit 34.

The motion sensor 35 includes at least a three-dimensional gyro sensor, and detects an angular velocity when the movable unit 34 performs a rotational motion. The controller 32 generates robot motion data indicating a rotation angle of the movable unit 34 based on the angular velocity detected by the motion sensor 35, and supplies the generated data to the communication unit 31. The communication unit 31 transmits the robot motion data to the image display device 10 via the network 20. The controller 32 may include a microcomputer or a microprocessor.

A captured image signal outputted from the camera 36 is supplied to the video signal processor 37. The video signal processor 37 performs compression encoding on the captured image signal and supplies the compression-encoded image data to the controller 32. The video signal processor 37 may perform other video signal processing other than compression encoding on the captured image signal. The controller 32 supplies the image data to the communication unit 31. The communication unit 31 transmits the image data to the image display device 10 via the network 20.

Referring to the flowcharts illustrated in FIGS. 4 to 6, a description will be given of how the synchronization controller 15 controls a correction of a cutout range in the image correction unit 18 when the synchronization switch 16 is set to ON and when the synchronization switch 16 is set to OFF.

Figure 4:
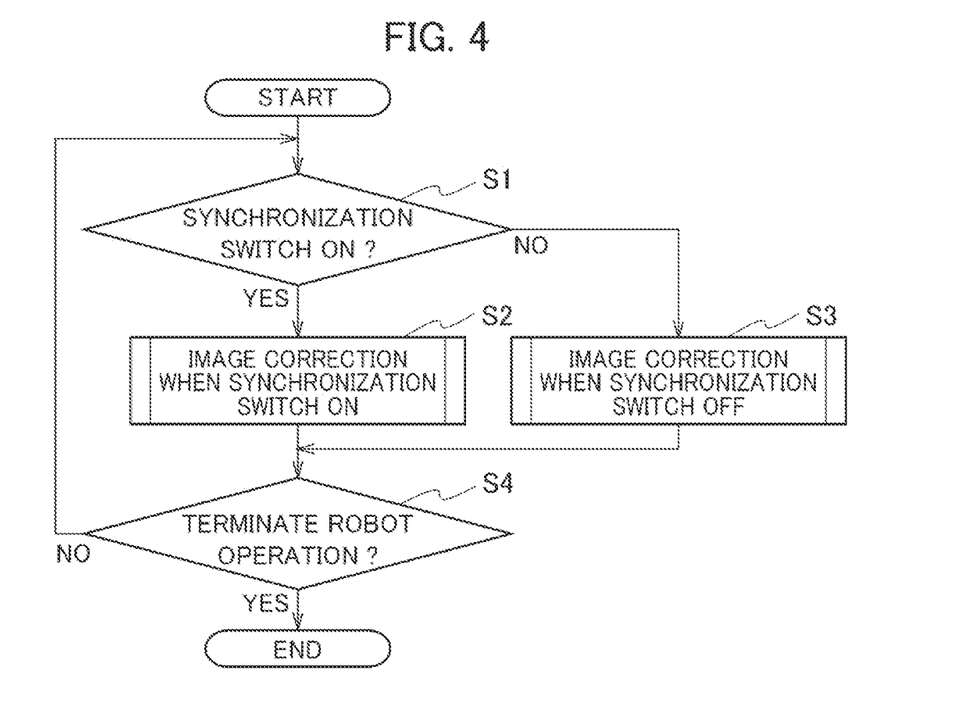
FIG. 4 is a flowchart illustrating a schematic process performed by the image display device according to one or more embodiments.

In FIG. 4, the synchronization controller 15 determines in step S1 whether or not the synchronization switch 16 is set to ON. When the synchronization switch 16 is set to ON (YES), in step S2, the synchronization controller 15 and the image correction unit 18 perform an image correction for when the synchronization switch 16 is ON as a correction of a cutout range. When the synchronization switch 16 is not set to ON (NO), in step S3, the synchronization controller 15 and the image correction unit 18 perform an image correction for when the synchronization switch 16 is OFF as a correction of a cutout range.

Following step S2 or S3, the process proceeds to step S4. In step S4, the image display device 10 determines whether the operation of the robot 30 is terminated by a predetermined operation performed by the operator 100. When the operation of the robot 30 is not terminated (NO), the image display device 10 repeats the process of steps S1 to S4. When the operation of the robot 30 is terminated (YES), the image display device 10 ends the process.

Figure 5:
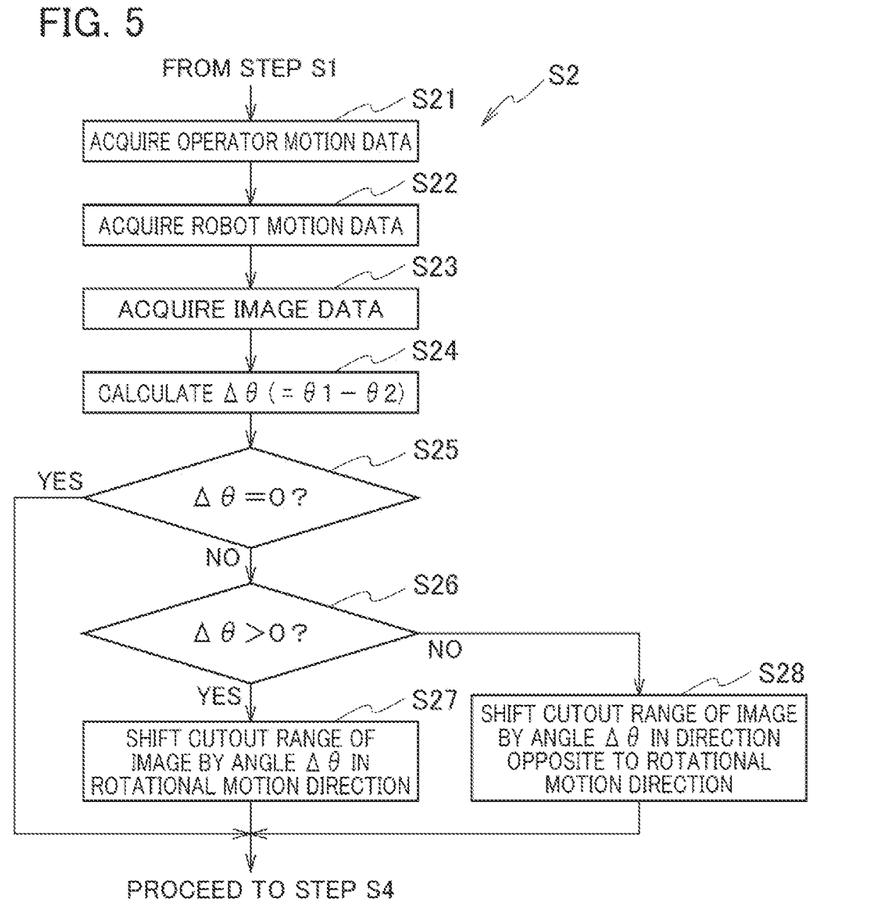
FIG. 5 is a flowchart illustrating a specific process of step S2 in FIG. 4.
Figure 6:
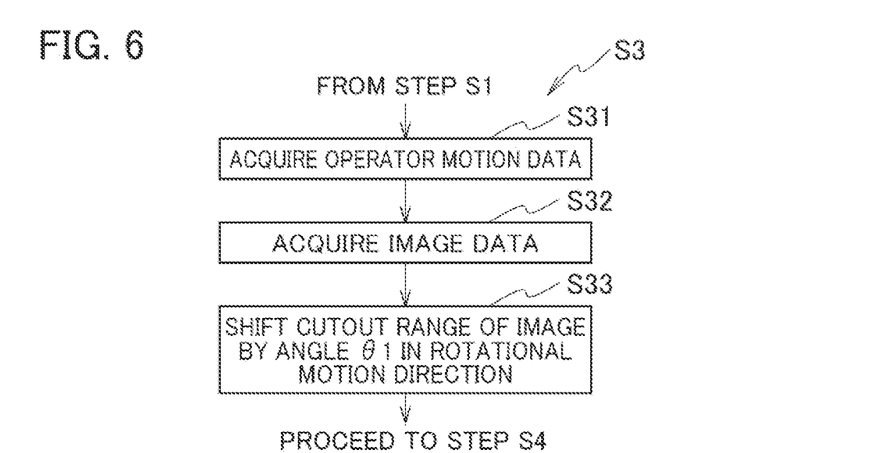
FIG. 6 is a flowchart illustrating a specific process of step S3 in FIG. 4.

FIG. 5 illustrates a specific process of step S2 in FIG. 4, and FIG. 6 illustrates a specific process of step S3 in FIG. 4. First, a specific process of step S2 will be described. In FIG. 5, in step S21, the synchronization controller 15 acquires the operator motion data stored in the operator motion data acquisition unit 13, and, in step S22, acquires the robot motion data stored in the robot motion data acquisition unit 14. In step S23, the image correction unit 18 acquires the image data stored in the image data acquisition unit 17. Steps S21 to S23 may be performed in any order or at the same time.

As illustrated in FIG. 1, it is assumed that a rotation angle of the image display device 10 is $\theta 1$ (first rotation angle), and a rotation angle of the robot 30 is $\theta 2$ (second rotation angle). In step S24, the synchronization controller 15 calculates an angle $\Delta\theta$ obtained by subtracting the rotation angle $\theta 2$ of the robot 30 from the rotation angle $\theta 1$ of the image display device 10. The angle $\Delta\theta$ indicates the difference between the angle of rotation $\theta 1$ and the angle of rotation $\theta 2$. In step S25, the synchronization controller 15 determines whether or not the angle $\Delta\theta$ is 0 degrees. When the angle $\Delta\theta$ is 0 (YES), the process proceeds to step S4 of FIG. 4.

When the angle $\Delta\theta$ is not 0 (NO) in step S25, the synchronization controller 15 determines in step S26 whether the angle $\Delta\theta$ is greater than 0. When the angle $\Delta\theta$ is greater than 0 (YES), in step S27, the image correction unit 18 corrects the cutout range so as to shift the cutout range of the image by the angle $\Delta\theta$ in the rotational motion direction. When the angle $\Delta\theta$ is not greater than 0 (NO), in step S28, the image correction unit 18 corrects the cutout range so as to shift the cutout range of the image by the angle $\Delta\theta$ in the direction opposite to the rotational motion direction. Following step S27 or step S28, the process proceeds to step S4.

Figure 7A:
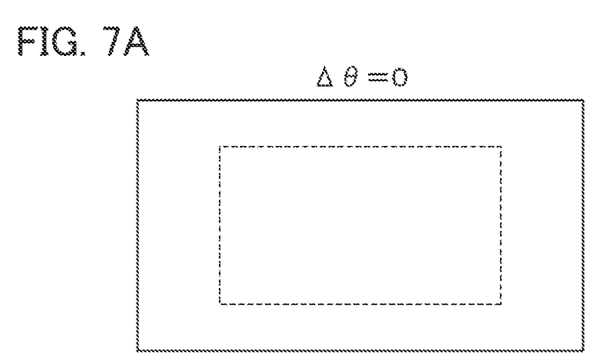
FIG. 7A is a diagram illustrating a state in which a cutout range of an image is not corrected in the flowchart illustrated in FIG. 5.
Figure 7B:
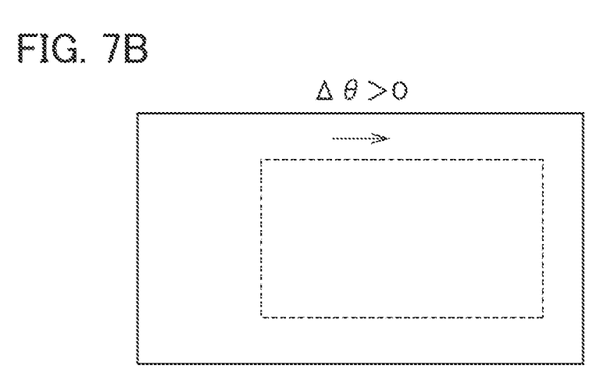
FIG. 7B is a diagram illustrating a state in which, in the flowchart illustrated in FIG. 5, the cutout range of the image is corrected so as to be shifted in a direction in which an operator performs a rotational motion.
Figure 7C:
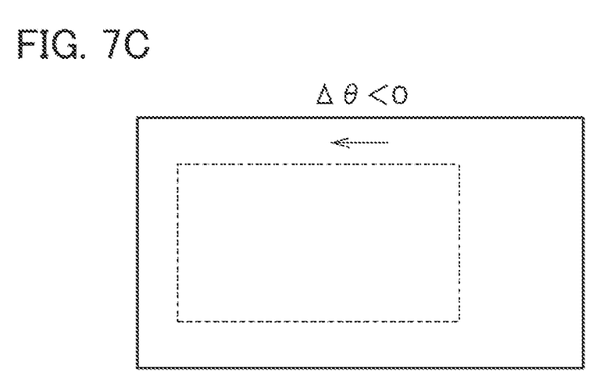
FIG. 7C is a diagram illustrating a state in which, in the flowchart illustrated in FIG. 5, the cutout range of the image is corrected so as to be shifted in a direction opposite to the direction in which the operator performs a rotational motion.

In FIGS. 7A to 7C, the rectangle indicated by the solid line indicates the range of the image input to the image correction unit 18 in the omnidirectional image. FIGS. 7A to 7C illustrate common image data for both the right eye and the left eye. The image correction unit 18 supplies, to the display panel 19, image data in the cutout range obtained by cutting out the range of the image illustrated by the broken line from the range of the image illustrated by the solid line. The area indicated by the broken line is referred to as a cutout area image. When the angle $\Delta\theta$ is 0, as illustrated in FIG. 7A, the image correction unit 18 cuts out the image in a state in which the center of the image range indicated by the solid line matches the center of the cutout range. FIG. 7A illustrates that the position of a predetermined cutout area image is not corrected.

The angle $\Delta\theta$ being greater than 0 means that the rotation angle $\theta 2$ of the robot 30 is smaller than the appropriate rotation angle $\theta 1$ as an appropriate angle. Accordingly, when the angle $\Delta\theta$ is greater than 0, the image correction unit 18 cuts out the image at a position where the cutout range is moved by the angle $\Delta\theta$ in the rotational motion direction (right direction in this case), as illustrated in FIG. 7B. The angle $\Delta\theta$ being less than 0 means that the rotation angle $\theta 2$ of the robot 30 is greater than the rotation angle $\theta 1$ as an appropriate angle. Accordingly, when the angle $\Delta\theta$ is smaller than 0, the image correction unit 18 cuts out the image at a position where the cutout range is moved by the angle $\Delta\theta$ in the direction opposite to the rotational motion direction (left direction in this case), as illustrated in FIG. 7C.

As described above, when the synchronization switch 16 is set to ON, the synchronization controller 15 controls the operator motion data acquisition unit 13 to transmit the operator motion data to the robot 30, and controls the image correction unit 18 as follows. It should be noted that the synchronization switch 16 is set to ON mainly in a case where it is necessary for the operator 100 and a person in the vicinity of the robot 30 to communicate with each other.

When there is a difference between the rotation angle $\theta 1$ of the image display device 10 indicated by the operator motion data and the rotation angle $\theta 2$ of the robot 30 indicated by the robot motion data, the image correction unit 18 corrects the cutout range, which is displayed on the display panel 19, in the omnidirectional image so as to be equal to a range corresponding to the rotation angle $\theta 1$. By correcting the cutout range displayed on the display panel 19 so as to be equal to a range corresponding to the rotation angle $\theta 1$, it is possible to reduce telexistence sickness caused by shifting between the direction of the operator 100 wearing the image display device 10 and the direction of the camera 36 mounted on the robot 30.

A specific process of step S3 illustrated in FIG. 6 will be described. In step S31, the synchronization controller 15 acquires the operator motion data stored in the operator motion data acquisition unit 13. In step 332, the image correction unit 18 acquires the image data stored in the image data acquisition unit 17. The order of steps S31 and S32 may be reversed, or steps S31 and S32 may be performed simultaneously. In step S33, the image correction unit 18 corrects the cutout range so as to shift the cutout range of the image by the rotation angle $\theta 1$ in the rotational motion direction. Following step S33, the process proceeds to step S4.

As described above, when the synchronization switch 16 is set to OFF, the synchronization controller 15 controls the operator motion data acquisition unit 13 so as not to transmit the operator motion data to the robot 30, and controls the image correction unit 18 as follows. It should be noted that the synchronization switch 16 is set to OFF mainly in a case where it is not necessary for the operator 100 and a person in the vicinity of the robot 30 to communicate with each other, and where it is sufficient to acquire an image captured by the camera 36.

The image correction unit 18 corrects the cutout range, which is displayed on the display panel 19, in the omnidirectional image so as to be equal to a range corresponding to the rotation angle $\theta 1$. The motion of the operator 100 is not synchronized with the motion of the robot 30, and the cutout range displayed on the display panel 19 is corrected to be equal to a range corresponding to the rotational motion of the operator 100, and thus it is possible to reduce telexistence sickness.

It should be noted that setting the synchronization switch 16 to ON may be performed automatically. The image display device 10 such as a head mount display is provided with a viewpoint detection function, and in a case where the operator 100 has been watching a specific person for a predetermined period of time or longer (that is, has been closely observing the person) when the synchronization switch 16 is OFF, the synchronization controller 15 determines that the operator 100 is trying to communicate with the specific person. At this time, even if the synchronization switch 16 is set to OFF, the synchronization controller 15 may switch the synchronization switch 16 to ON (to a state equivalent to the state of being set to ON). Further, when the operator 100 stops closely observing the person after having closely observed the person for a predetermined period of time, the synchronization controller 15 may be configured to set the synchronization switch 16 back to OFF, and return the posture of the robot 30 to the posture that was adopted before the synchronization switch 16 was set to ON.

Figure 8:
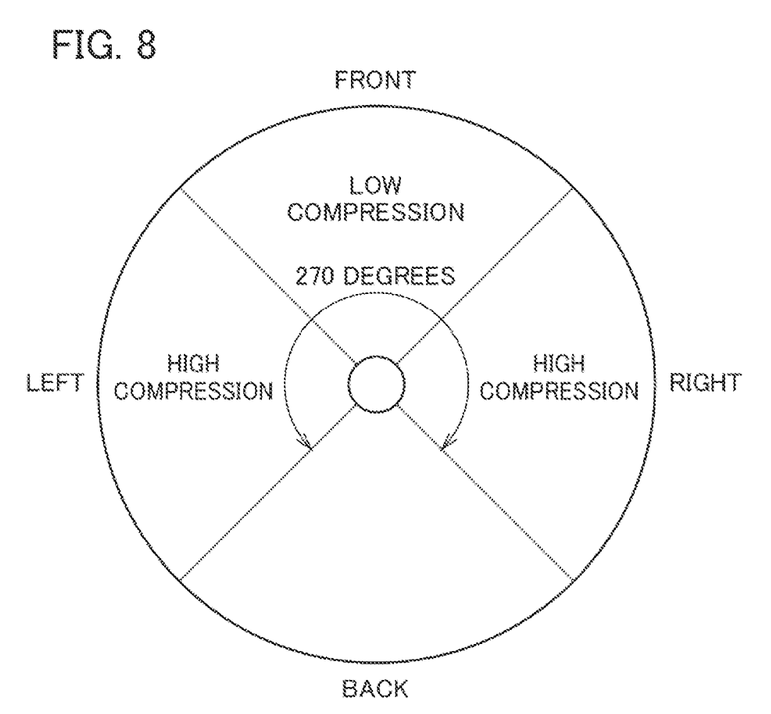
FIG. 8 is a diagram illustrating an example in which a range of an image having a viewing angle wider than a field angle of a display panel is used as a cutout range of an image.
Figure 9:
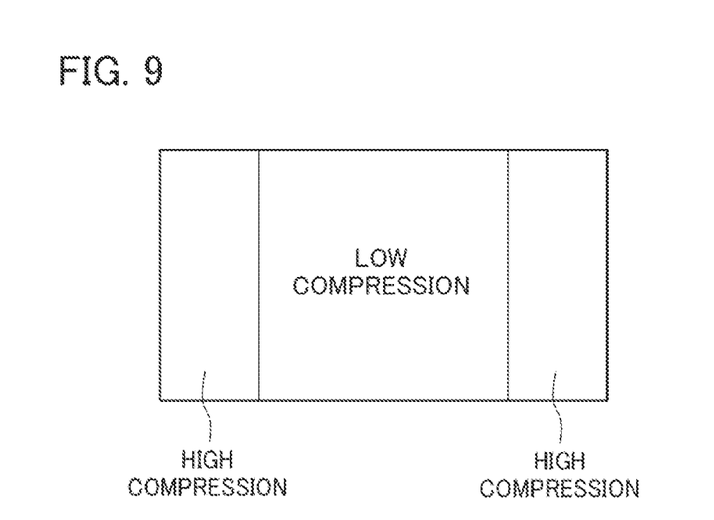
FIG. 9 is a diagram illustrating an example of compressing the size of the cutout range illustrated in FIG. 8 so as to fit within the field angle of the display panel.

As illustrated in FIG. 8, the image correction unit 18 may cut out a range of an image having, for example, a viewing angle of 270 degrees, which is wider than the field angle of the display panel 19, from the image data acquired by the image data acquisition unit 17, as a cutout range. In this case, as illustrated in FIG. 9, the image correction unit 18 horizontally compresses the size of the cutout range so as to fit within the field angle of the display panel 19. For example, it is preferable that the image correction unit 18 divides the range of 270 degrees into three areas which are 90 degrees in the middle and 90 degrees on the left and right sides, and that the range of 90 degrees in the middle is low compression and the range of 90 degrees on the left and right sides is high compression. The low compression in the range of 90 degrees in the middle includes a compression ratio of 0.

When a range of an image having a viewing angle wider than the field angle of the display panel 19 is displayed on the display panel 19, the operator 100 can easily obtain necessary visual information without rotating his/her head. Accordingly, it is possible to reduce telexistence motion sickness.

The present invention is not limited to one or more embodiments described above, and may be varied in various ways without departing from the scope of the present invention.

What is claimed is:

1. An image display device comprising:
an operator motion data acquisition unit configured to acquire operator motion data indicating a first rotation angle produced when an operator who operates a robot performs a rotational motion;
a robot motion data acquisition unit configured to acquire robot motion data which indicates a second rotation angle produced when the robot performs a rotational motion in accordance with the operator motion data and is transmitted from the robot;
an image data acquisition unit configured to acquire image data which is generated by being captured by a 360-degree camera provided in the robot and is transmitted from the robot;
an image correction unit configured to supply, to a display panel, image data in a cutout range obtained by cutting out a range of an image to be displayed on the display panel to be viewed by the operator, from the image data acquired by the image data acquisition unit, and to correct the cutout range;
a synchronization switch configured to set whether or not to synchronize a rotational motion of the operator with a rotational motion of the robot; and
a synchronization controller configured to perform control so that the operator motion data is transmitted to the robot when the synchronization switch is set to ON which allows synchronization of a rotational motion of the operator with a rotational motion of the robot, and to control the image correction unit to correct the cutout range so as to be equal to a range corresponding to the first rotation angle when there is a difference between the first rotation angle and the second rotation angle, and configured to perform control so that the operator motion data is not transmitted to the robot when the synchronization switch is set to OFF which does not allow synchronization of a rotational motion of the operator with a rotational motion of the robot, and to control the image correction unit to correct the cutout range so as to be equal to a range corresponding to the first rotation angle.

2. The image display device according to claim 1, wherein the synchronization controller, when the synchronization switch is set to ON which allows synchronization of a rotational motion of the operator with a rotational motion of the robot, corrects the cutout range so as to be shifted in a direction in which the operator performs a rotational motion, by a difference between the first rotation angle and second rotation angle in a case where the first rotation angle is greater than the second rotation angle, and corrects the cutout range so as to be shifted in a direction opposite to the direction in which the operator performs a rotational motion, by a difference between the first rotation angle and second rotation angle in a case where the first rotation angle is smaller than the second rotation angle.

3. The image display device according to claim 1, wherein the synchronization controller is in a state equivalent to a state in which the synchronization switch is set to ON, when the operator has been watching an image displayed on the display panel for a predetermined period of time or longer.

4. The image display device according to claim 1, wherein the image correction unit cuts out a range of an image having a viewing angle which is wider than a field angle of the display panel, from the image data acquired by the image data acquisition unit as the cutout range, and compresses a size of the cutout range so as to fit within the field angle of the display panel.

5. An image display method comprising:
acquiring operator motion data indicating a first rotation angle produced when an operator who operates a robot performs a rotational motion;
acquiring robot motion data which indicates a second rotation angle produced when the robot performs a rotational motion in accordance with the operator motion data and is transmitted from the robot;
acquiring image data which is generated by being captured by a 360-degree camera provided in the robot and is transmitted from the robot;
supplying, to a display panel, image data in a cutout range obtained by cutting out a range of an image to be displayed on a display panel to be viewed by the operator, from the acquired image data;
performing control so that the operator motion data is transmitted to the robot when a setting is implemented so that a rotational motion of the operator is synchronized with a rotational motion of the robot, and correcting the cutout range so as to be equal to a range corresponding to the first rotation angle when there is a difference between the first rotation angle and the second rotation angle; and performing control so that the operator motion data is not transmitted to the robot when s setting is set to OFF which does not allow synchronization of a rotational motion of the operator with a rotational motion of the robot, and correcting the cutout range so as to be equal to a range corresponding to the first rotation angle.

* * * * *